Jan. 7, 1936.                    A. W. TONDREAU                    2,026,660
                FILM ADVANCING MECHANISM FOR MOTION PICTURE APPARATUS
                        Filed April 2, 1932        3 Sheets-Sheet 1
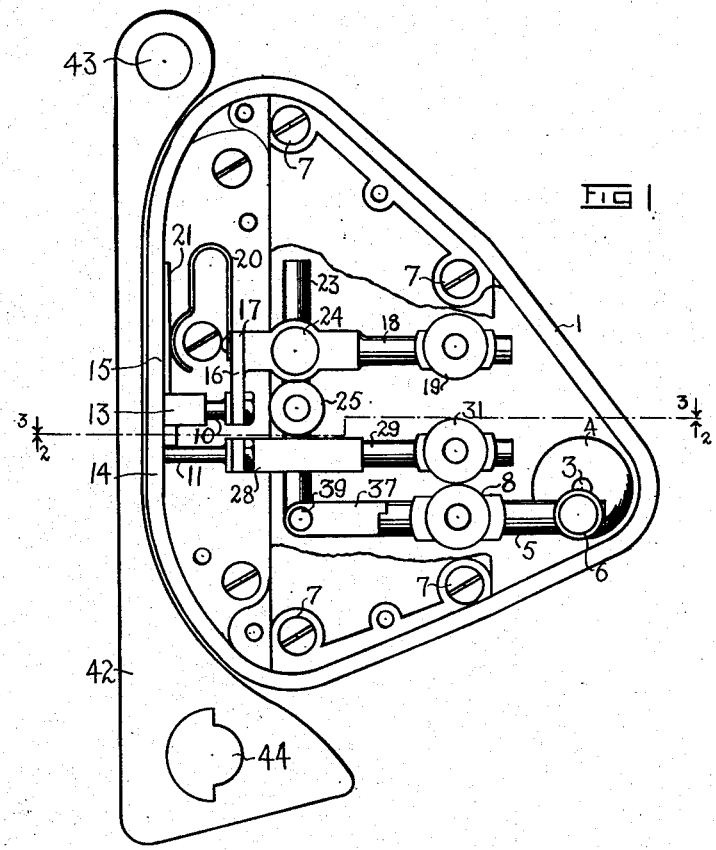
INVENTOR:
ALBERT. W. TONDREAU.
BY
ATTORNEY.

Jan. 7, 1936. A. W. TONDREAU 2,026,660
FILM ADVANCING MECHANISM FOR MOTION PICTURE APPARATUS
Filed April 2, 1932    3 Sheets-Sheet 2
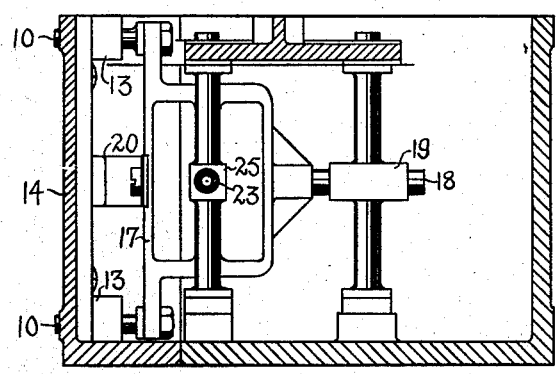
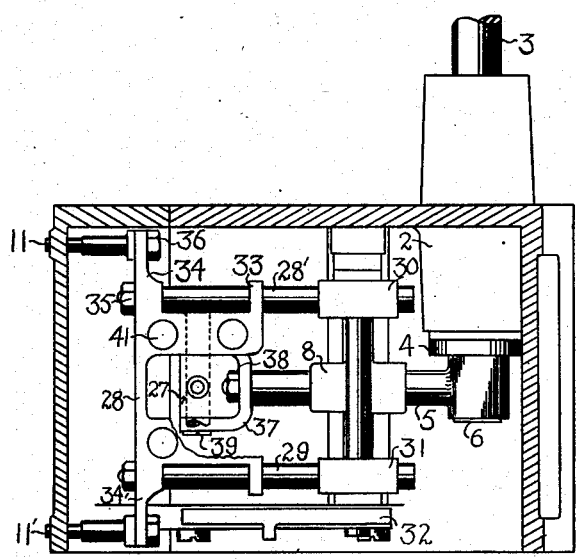
INVENTOR.
ALBERT W. TONDREAU.
BY
ATTORNEY

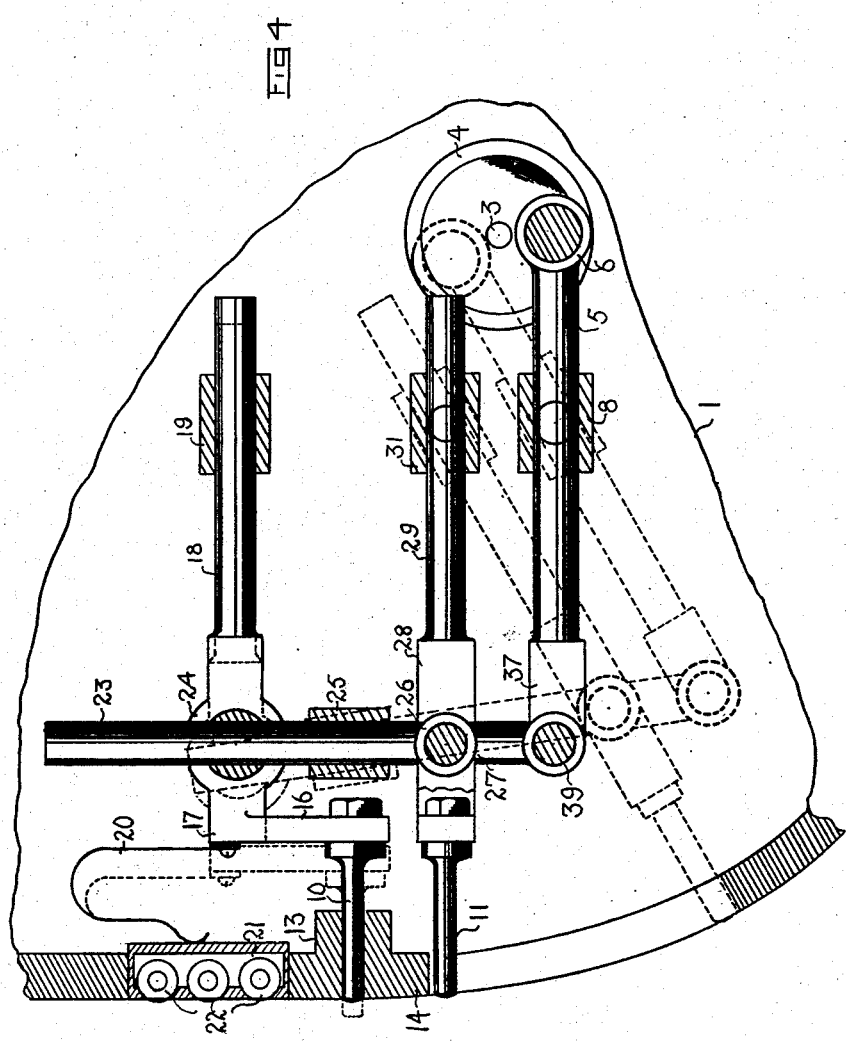

Patented Jan. 7, 1936

2,026,660

UNITED STATES PATENT OFFICE 2,026,660

FILM ADVANCING MECHANISM FOR MOTION PICTURE APPARATUS

Albert W. Tondreau, Hollywood, Calif., assignor to Warner Bros. Pictures, Inc., New York, N. Y., a corporation of Delaware Application April 2, 1932, Serial No. 602,728

12 Claims. (Cl. 88—18.4)

The invention relates to film advancing mechanism for motion picture apparatus, particularly a camera, wherein a mechanical movement, or shuttle mechanism, is employed for imparting step-by-step motion to the film.

Such film advancing mechanism commonly employs pilot, or register, pins and a shuttle fork or pull-down pins which must operate in a particular timed relation with each other, whereby the pull-down pins serve to pull down the film while the register pins are retracted, and the register pins serve to hold the film stationary while the pull-down pins are returning to their operative position.

It has heretofore been proposed to obtain the desired timed relation between the register and pull-down pins partly by the use of gears, or by the use of gears in combination with operating members having cam surfaces. Both of these expedients are objectionable, as they lead to noisy operation of the camera, and the use of cam surfaces is further objectionable, as they are not only expensive to make, but continued operation of the camera wears down the cam surface unevenly and disturbs the proper timed relation between the register and pull-down pins.

An object of the present invention is to overcome the defects above noted, and to provide a camera which will be quiet in operation, particularly in the case where the proper timing relation between the register and pull-down pins is not disturbed by long continued operation of the camera.

Another object of the invention is to move the register, or pilot, pin in a straight line to prevent tearing the film aperture, and to obtain these results with film advancing mechanism which gives a full 180 degree shutter opening of the camera.

These objects are accomplished by driving the pilot and pull-down pins through a link movement operated by an eccentric.

As to that part of the invention concerned with quietness of operation, the invention is based on the conception that cylindrical bearing surfaces, whether sliding or rotating, and sliding surfaces, whether cylindrical or not, are inherently quiet, and the invention provides for the exclusive use of such bearing surfaces in the mechanical movement comprising the film advancing mechanism of this invention. By way of example, such bearing surfaces are incorporated in a link movement which transmits power to the film advancing member and/or to the film registering member.

Another feature of the invention, which is particularly useful in connection with wide film, relates to holding the film flat in the gate while the film is stationary, without restricting the free movement of the film through the gate. This is accomplished by varying the pressure on the pressure pad for the film in timed relation with the film operating means, whereby the pressure on the pad is released when the film is in motion and the film is held taut when stationary.

Reference is made to the drawings, wherein

Fig. 1 is a side elevation of the intermittent film advancing mechanism, with the cover plate partly broken away, to show details of the movement.

Fig. 2 is a plan view in cross-section, looking up from the line 2—2 of Fig. 1.

Fig. 3 is a plan view in cross-section, looking up from line 3—3 of Fig. 1.

Fig. 4 is a schematic side elevation of the movement, showing the position adopted by the various elements at the beginning and at the end of their stroke.

Referring more particularly to the drawings, in the operation of a motion picture camera employing the invention it is essential that the pilot pins 10 enter a perforation in the film as soon as the pull-down, or claw, pins 11 and 11' are withdrawn from the film and holding the film stationary while the claw pins 11 and 11' are moved to a position where they are again brought into engagement with the film. During this interval, the film is held taut, and a photograph is registered upon that part of the film directly behind the film gate. It is desirable that this interval be sufficiently long to allow the film to be properly exposed, when the movement is used in a motion picture camera, and to be completely projected, when the device is used in a motion picture projector. In order to effect such a movement, a bushing 13 is mounted upon the plate 14, opposite the film gate, to receive the pilot pins 10 and to allow them to move only in a straight line. The pins 10 are bolted to a bracket 16 which forms the outer edge of a fork 17 (illustrated best in Fig. 2). Suitably fastened to the center of the opposite edge of the fork 17 is a rod 18 slidably supported by a bearing 19, fastened to the back plate 1. A spring finger 20 is attached to a mid-point of the bracket 16 and presses upon the back of a pressure plate 21 (Fig. 4) that is mounted in an aperture of the plate 14. This pressure plate 21 is provided with rollers 22 for engaging the back of the film. When the fork 17 is advanced and the pilot pins 10 are in engagement with the film, the spring finger 20 is depressed and exerts a force on the pressure plate 21, so that the film is held rigidly, but when the fork 17 is withdrawn and the pilot pins 10 are out of engagement with the film, this force is relieved and allows the pull-down pins 11 and 11' to freely advance the film, without any drag from the pressure plate 21. The pilot pins 10 are reciprocally moved by means of a link 23 that slides in a bearing 24, rotatably mounted in the center of the fork 17. This link member 23 is supported by a slide bearing 25 pivotally mounted on the plate 1, and is pivotally attached at its lower end to a driven connecting rod member 5.

A shaft 27 supported at its ends by the sides of shuttle fork 28 is pivotally connected at 26 (Fig. 4) to an intermediate point on the link member 23 in the center of the shuttle fork 28. The link member 23 rocks about the slide bearing 25 as a pivot point, the sliding connection 24 between this link and the register pin rod being above the bearing 25, whereas the pivoted connection 26 between this link and the shuttle fork, or pull-down member, 28 is below the bearing 25.

It will be obvious that the link member 23 above the pivot point 26 follows the motion of the shuttle fork 28 and imparts motion to the pilot pins 10 fastened to the fork 17 through the rocker bearing 24.

The shuttle fork 28 (Fig. 3) is in the shape of a yoke with U-shaped boss extensions 33 and 34. The boss 33 has an aperture adapted to receive and support the rod 28', and the boss 34 has an aperture which is screw threaded to receive the end of the rod 28', to which is fastened nut 35. The boss 34 is extended, and has a further aperture that is adapted to receive the claw pin 11. This pin 11 is held in place by the nut 36. The shuttle fork 28 has a similar oppositely extending boss 34' for similarly supporting the pin 11'. There is a similar arrangement for the support of the rod 29 and the claw pin 11' at the opposite side of the yoke. Holes 41 are drilled in the yoke of the shuttle fork 28 for the sake of lightness.

The connecting rod member 5 is joined at one end to a pin member 6, mounted eccentrically on a disc, or eccentric, 4, and supported for reciprocal rocking motion by a slide bearing 8 pivotally mounted to the back plate 1. The other end of the rod 5 is threaded and projects through an aperture in the base of a U-shaped member 37. The rod 5 is held in place in member 37 by means of a nut 38 (see Fig. 3). The wings of the U member 37 form bearing housings to support a shaft 39 which is pivotally connected to the lower end of link member 23.

The eccentric, or disc, 4 is mounted at the end of shaft 3, rotatably supported by a bearing housing 2 on the back plate 1. This shaft 3 is driven through a gear train by the camera motor (not shown).

Referring to Fig. 1, an aperture plate 42 is slidably mounted on the side wall of a motion picture camera (not shown). The uppermost end of this plate 42 is journaled to a pin 43, and the lowermost end is fastened by an expanding lock 44. When the lock 44 is unlocked, the aperture plate may be swung outwardly, whereby a motion picture film may be easily threaded through the machine. When plate 42 is in the position in Fig. 1 and lock 44 is in its closed position, the aperture plate 42 is in line with the plate 14, leaving a narrow guide path through which the motion picture film passes. The lower end portion of the plate 14 is curved rearwardly, and is provided with a pair of parallel longitudinal slots (not shown) in alignment with the perforations in the motion picture film. These slots are adapted to receive the pull-down claws 11 and 11' when the motion picture film is being advanced, as is well understood.

By locating the center of rotation of the shuttle fork 28 at the point 31, a long, narrow arc of travel is given to the pull-down pins 11 and 11', which means that they move in substantially straight line, parallel to the film gate. This would not be the case if the pins 11 and 11' were mounted at the end of the connecting arm 5, for then the shuttle fork would move in a short, wide arc, and a sawing motion would be obtained, resulting in the perforations of the film being torn.

The rotation of the disc, or eccentric 4, which moves in a clockwise direction, alters the length of the lever arm on either side of the fulcrum point 8, so that when the arms 5 and 29 are in the two positions shown in Fig. 4, that part of the lever arm in front of the fulcrum point 8 is relatively longer than that part to the rear of the fulcrum point, thus insuring that the claw pins 11 and 11' move downward at a comparatively fast speed. However, when the pin 6 on the eccentric 4 has moved to a position where the claws 11 and 11' are withdrawn from the film, the part of the lever arm to the rear of the fulcrum 8 is relatively longer than the part to the front, thus assuring the claw pins of a comparatively slow return to the point where they once again engage the film. Thus, it will be seen that while the pull-down claws 11 and 11' are moving at their slowest speed, the photograph is being registered upon the film held stationary in front of the film gate, and a shutter opening at least as large as 180° and, in fact, as large as 210° with the construction shown, is obtained.

I claim:

1. Film advancing mechanism for motion picture apparatus comprising a film advancing member, means for pivotally supporting said member for reciprocating rocking motion, a connecting rod, a link connecting said member and said rod, and pivotally connected to each thereof, a rocking slide bearing for said link, means for pivotally supporting said rod for reciprocating rocking motion, and means for imparting rotary movement to said rod to reciprocate said rod.

2. Film advancing mechanism for motion picture apparatus comprising a film advancing member, a film registering member, a link connected to both of said members for transmitting motion thereto, a sliding connection between said link and said registering member, a connecting rod, means for pivotally connecting said rod to said link, and an eccentric for operating said connecting rod.

3. Film advancing mechanism for motion picture apparatus comprising a link member, means comprising a bearing for surrounding and supporting said link member for rocking and sliding movements, register pin mechanism, an operative connection between said register pin mechanism and said link member at one side of said supporting means, a pull-down mechanism, an operative connection between said pull-down mechanism and said link at the other side of said supporting means, and means for rocking and sliding said link member in said bearing.

4. Film advancing mechanism for motion picture apparatus comprising a link member, means for imparting rocking and sliding movements to said link member, means for supporting said link member for such movements, a pin member adapted to co-operate with the apertures in the film, said supporting means comprising means for pivotally supporting said link member for rocking movement about an axis above said pin member, a connection between said pin member and said link member, a rotatable shaft for imparting motion to said link member, and a power drive between said shaft and said link member comprising exclusively cylindrical bearing surfaces.

5. Film advancing mechanism for motion picture apparatus comprising an eccentric, a connecting rod operated thereby, a link pivotally connected to said connecting rod, a pull-down rod pivotally connected to said link, rocking slide bearings for said rods and said link, a register pin rod, a fixed slide bearing therefor, and a rocking, sliding connection between said register pin rod and said link.

6. Motion picture apparatus comprising a connecting rod and a link member angularly disposed and pivotally connected thereto, a register pin member, connections between said link member and said pin member whereby the latter is reciprocated in a straight line, a shuttle fork member, means for pivotally connecting said shuttle fork member to said link member, and operating means for said connecting rod.

7. Film advancing mechanism for motion picture apparatus comprising an eccentric, a link member operated thereby, a register pin member, means for guiding said register pin member in a straight line, a sliding connection between said register pin member and said link member, means for supporting said link member for sliding movement between said eccentric and the film gate, a shuttle fork member, means for connecting said shuttle fork member to said link member, and means for supporting said shuttle fork member for sliding movement.

8. Motion picture apparatus comprising a pressure pad for the film, a register pin member, a U shaped spring between said pad and said member and fastened to one thereof and in sliding engagement with the other thereof, and means for operating said pin member.

9. Film advancing mechanism for motion picture apparatus comprising an eccentric, a connecting rod operated thereby, means for pivotally connecting said rod to a fixed point in said eccentric, a link member pivotally connected to said connecting rod and extending substantially at right angles thereto and substantially parallel to the film gate, spaced parallel register pin and pull-down rods extending across said link member and pivotally connected thereto, a pivotal slide bearing for said link member between said register pin rod and said pull-down rod, a pivotal support for said connecting rod between said eccentric and the point of connection of said connecting rod to said link member, a fixed slide bearing for said register pin rod, and a rocking slide bearing for said pull-down rod.

10. Film advancing mechanism for motion picture apparatus comprising an eccentric, a connecting rod operated thereby, means for pivotally connecting said rod to a fixed point in said eccentric, a link member pivotally connected to said connecting rod and extending substantially at right angles thereto and substantially parallel to the film gate, spaced parallel register pin and pull-down rods extending across said link member and pivotally connected thereto, a pivotal slide bearing for said link member between said register pin rod and said pull-down rod, a pivotal support for said connecting rod between said eccentric and the point of connection of said connecting rod to said link member, a fixed slide bearing for said register pin rod, and a rocking slide bearing for said pull-down rod, the points of connection of said link member to said connecting rod and to said pull-down rod, together with the point of connection of said connecting rod to said eccentric and the positions of said pivotal support for said connecting rod and said bearing for said pull-down rod being so related that said connecting rod and said pull-down rod are substantially parallel throughout the path of travel of said pull-down rod.

11. Film advancing mechanism for motion picture apparatus comprising a film advancing member, means for advancing and withdrawing said member and for pulling down said member comprising an eccentric, a connecting rod therefor, a link movement pivotally connected to said connecting rod and to said member for advancing, withdrawing and pulling down said member, a bearing providing a sliding pivotal support for said link intermediate the ends thereof, and means for supporting said eccentric for rotation about an axis substantially parallel to the horizontal width of the film gate.

12. Intermittent film mechanism comprising the combination of an eccentric, a connecting rod connected thereto, a bearing support providing a fixed pivot point for an intermediate portion of said connecting rod, a claw member operatively connected to said connecting rod and adapted to support claws, a register pin rod, a link having one end portion thereof operatively connected with said register pin rod, and the other end portion thereof operatively connected with said claw member, and means providing a fixed pivot point support for an intermediate portion of said link.

ALBERT W. TONDREAU.